US009844903B2

(12) United States Patent
Xie et al.

(10) Patent No.: US 9,844,903 B2
(45) Date of Patent: Dec. 19, 2017

(54) MANUFACTURING METHOD OF HOUSING AND ELECTRONIC DEVICE

(71) Applicant: Lenovo (Beijing) Limited, Beijing (CN)

(72) Inventors: Yuming Xie, Beijing (CN); Liang Bo, Beijing (CN); Xudong Jing, Beijing (CN); Shurong He, Beijing (CN); Xiaoqin Han, Beijing (CN); Lei Ma, Beijing (CN); Lei Xu, Beijing (CN); Lan Zhou, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 72 days.

(21) Appl. No.: 14/230,675

(22) Filed: Mar. 31, 2014

(65) Prior Publication Data

US 2015/0077910 A1 Mar. 19, 2015

(30) Foreign Application Priority Data

Sep. 13, 2013 (CN) .......................... 2013 1 0418192

(51) Int. Cl.
*B29C 45/37* (2006.01)
*B29C 45/17* (2006.01)
(Continued)

(52) U.S. Cl.
CPC .......... *B29C 45/372* (2013.01); *B23K 26/361* (2015.10); *B29C 45/17* (2013.01);
(Continued)

(58) Field of Classification Search
CPC ...... B29C 45/372; B29C 45/17; B23K 26/362
(Continued)

(56) References Cited

U.S. PATENT DOCUMENTS 3,631,298 A * 12/1971 Davis .................... D03D 1/0088
139/425 R
4,898,706 A * 2/1990 Yabe ..................... B29C 45/1418
264/132
(Continued)

FOREIGN PATENT DOCUMENTS

CN 2731516 Y * 10/2005
CN 101340469 A 1/2009
(Continued)

OTHER PUBLICATIONS

First Office Action, including Search Report, for Chinese Patent Application No. 201310418192.3, dated May 3, 2016, 25 pages.
(Continued)

*Primary Examiner* — Tuan T Dinh
*Assistant Examiner* — Rockshana Chowdhury
(74) *Attorney, Agent, or Firm* — Westman, Champlin & Koehler, P.A.

(57) ABSTRACT

The present invention discloses a method of manufacturing a housing and an electronic device. The method comprises the following steps: preparing a mold according to a predetermined shape of the housing, wherein the mold comprises at least one moving die and at least one fixed die, a first texture structure is formed on the inner surface of the mold, and the first texture structure comprises a plurality of projections arranged in a first arrangement, and a groove recesses inwardly is formed between any two adjacent projections, and the groove is formed by etching and removing a part of the moving die and/or the fixed die by the laser engraving method; closing the moving die and the fixed die, and heating the mold to a predetermined mold temperature; and injecting a raw material in a melting state into the mold cavity of the mold; retaining a pressure of the raw material in the mold cavity of the mold; cooling the mold; opening the mold to complete the housing. The housing made of the (Continued)

first material exhibits a second material effect in visual and/or tactile senses.

5 Claims, 4 Drawing Sheets

(51) Int. Cl.
    *B23K 26/361*     (2014.01)
    *B29L 31/00*     (2006.01)
    *B29L 31/34*     (2006.01)
    *B29C 45/00*     (2006.01)

(52) U.S. Cl.
    CPC ... *B29C 45/0053* (2013.01); *B29L 2031/3481* (2013.01); *B29L 2031/757* (2013.01)

(58) Field of Classification Search
    USPC .................................................. 361/679.01
    See application file for complete search history.

(56) References Cited

U.S. PATENT DOCUMENTS

| | | | |
|---|---|---|---|
| 7,989,085 B2 * | 8/2011 | Li | H04M 1/0283 174/50 |
| 8,567,975 B2 | 10/2013 | Yoo | |
| 2006/0087058 A1 | 4/2006 | Hooker | |
| 2010/0007045 A1 | 1/2010 | Hsu et al. | |
| 2012/0055938 A1 * | 3/2012 | Yoo | H04M 1/0283 220/660 |
| 2012/0327048 A1 * | 12/2012 | Ramrattan | H05K 1/148 345/204 |
| 2013/0017370 A1 * | 1/2013 | Yamaguchi | A61F 13/51121 428/167 |
| 2014/0356563 A1 * | 12/2014 | Yang | B29C 35/0805 428/35.7 |

FOREIGN PATENT DOCUMENTS

| | | |
|---|---|---|
| CN | 101623915 A | 1/2010 |
| CN | 101640995 A | 2/2010 |
| CN | 102387228 A | 3/2012 |
| WO | 2010025515 A1 | 3/2010 |

OTHER PUBLICATIONS

Second Office Action for Chinese Patent Application No. 201310418192.3, dated Jan. 25, 2017, 5 pages.

* cited by examiner

MANUFACTURING METHOD OF HOUSING AND ELECTRONIC DEVICE

CROSS REFERENCE TO RELATED PATENT APPLICATIONS

This application claims the benefit of Chinese Patent Application No. 201310418192.3 filed on Sep. 13, 2013 in the State Intellectual Property Office of China, the disclosure of which is incorporated herein by reference.

FIELD OF THE INVENTION

The present invention relates to injection molding technology, and in particular, to a housing for an electric device, a manufacturing method of the same and the electronic device.

DESCRIPTION OF THE RELATED ART

Organic macromolecule material is generally used for a housing of an electric or electronic product. The housing may have various shapes, in order to be suitable for various products in which it will be applied. In the prior art, a housing made of organic macromolecule material is usually obtained by injection molding process. Specifically, a mould having a corresponding shape or structure is firstly produced, the macromolecule material is then injected into the mould, and finally a corresponding housing can be achieved after melting, forming, demolding processes and the like.

In order to form concave-convex structures or texture structures on the surface of the housing, it is necessary to treat the inner surface of the mold cavity of the mould. For forming the fine structures, especially the texture structures with a dimension less than millimeter-order, chemical etching or reversing mould method is usually used in the prior art.

In the existing chemical etching method, the inner wall of the mold cavity is gradually and partially dissolved to form the texture structure by chemical reaction of a chemical liquid with the inner wall of the mold cavity. However, since the chemical liquid has a property of isotropy, the result of etching is smooth grooves, instead of vertical groove side walls and sharp corners, as time lapses. For two grooves closely adjacent to each other, as work surfaces are etched along a side direction, two work surfaces will be perforated, and the design object will not be achieved. Furthermore, for many structures having three-dimensional shapes, such as grooves with irregular wave shapes, it is very difficult to form them by the etching method.

When the existing reversing mould method is used to manufacture a mould having a texture structure, e.g., to manufacture a mould having textile fabric structure, it is necessary to coat a handboard with the textile fabric to perform "reversing mould" operation. It will lead to two disadvantages, one of which is that the process of reversing mould has a lower efficiency, and the other of which is that there is a risk during separating operation of the fabric from the reversing mold, especially if the fabric lacks elasticity, which will cause crinkling at the edges or pulled deformation for the coating of the 3D-curved surface, thereby causing failure of "reversing mould" operation.

Concerning the above, since the above-mentioned defects are present in the manufacturing process of a mold in the prior art, it is impossible to obtain an inner surface of a mold cavity of a mould having a precise textile fabric structure and hence to obtain an injection product having a surface structure same or similar to that of the textile fabric by the mold.

SUMMARY OF THE INVENTION

A main object of the present invention is to provide a method of manufacturing a housing and an electronic device, so that at least a part of a surface of the housing made of a first material presents visual and/or tactile effects of the other material.

The object of the present invention is achieved by the following solutions. A method of manufacturing a housing is embodied in an embodiment of the present invention, the housing being used in an electric device, and the method comprises the following steps:

preparing a mold according to a predetermined shape of the housing, wherein the mold comprises at least one moving die and at least one fixed die which are matched to form at least one mold cavity, the shape of the mold cavity being the same as the predetermined shape of the housing; wherein an inner surface of the mold is etched by a laser engraving method to form a first texture structure on the inner surface of the mold, and the first texture structure comprises a plurality of projections arranged in a first arrangement, and a groove recessed inwardly is formed between any two adjacent projections, and the groove is formed by etching and removing a part of the moving die and/or the fixed die by the laser engraving method;

closing the moving die and the fixed die to form the mold cavity, and heating the mold up to a predetermined mold temperature;

heating a raw material to be into a melting state, and injecting the raw material in the melting state into the mold cavity of the mold, and the raw material being a first material;

retaining a pressure of the raw material in the mold cavity of the mold so as to sufficiently fill the raw material in the melting state into the fist texture structure;

cooling the mold to solidify the raw material in the melting state and shape it into a housing shape;

opening the mold and separating the moving die from the fixed die to complete the housing, wherein at least a part of the surface of the housing has a plurality of recesses, and there are spaces between any two adjacent recesses, and the recesses are formed by embedding the projections into the raw material, and the spaces are formed by embedding the raw material into the groove; a second material effect exhibits on at least the part of the surface of the housing by the plurality of recesses and the spaces, and the second material being different from the first material;

wherein the predetermined mold temperature is lower than the melting temperature of the first material.

Further, the second material effect is textile effect, and the textile effect is an effect in visual and/or tactile senses sensed by a user when the user observes and/or touches an outer surface of a first part of the housing.

Further, the first texture structure comprises an edge area and a central area, and the edge area surrounds the central area, and the edge area corresponds to an edge of the electronic device; the projections comprise a first projection located in the edge area and a second projection located in the central area, a height of the first projection being lower than that of the second projection.

Further, the height of the first projection is gradually reduced with far away from the central area.

Further, a circumscribed circle of the cross section, which has the maximum area, of the projection has a diameter of 0.08-0.38 mm, and the height of the projections is greater than 0.02 mm.

Further, the method of manufacturing a housing comprises the steps of: providing a coating on the outer surface of the housing by spray coating, printing, vacuum evaporating, vacuum splattering, electroplating or transfer printing in the mold.

Further, the first material is thermosetting plastics, thermoplastic plastics, metal or rubber.

Further, the first material is acrylonitrile-butadiene-acrylate copolymer, acrylonitrile-butadiene-styrene copolymer, acrylonitrile-ethylene-styrene copolymer, acrylonitrile-methyl methacrylate copolymer, poly(aromatic ester), acrylonitrile-styrene resin, acrylonitrile-styrene-acrylate copolymer, cellulose acetate plastics, cellulose acetate-butyrate plastics, cellulose acetate propionate, general cellulose plastics, cresol-formaldehyde resin, carboxymethyl cellulose, cellulose nitrate, cellulose propionate, chlorinated polyethylene, chlorinated poly(vinyl chloride), casein, cellulose triacetate, ethyl cellulose, ethylene-ethyl acrylate copolymer, ethylene-methacrylic acid copolymer, epoxy resin, ethylene-propylene-dieneterpolymer, ethylene-propylene copolymer, expanded polystyrene, ethylene-tetrafluoroethylene copolymer, ethylene-vinyl acetate copolymer, ethylene-vinyl alcohol copolymer, perfluoro(ethylene-propylene) plastics, furan-formaldehyde, high density polyethylene plastics, high impact-resistant polystyrene, impact resistant polystyrene, liquid crystal polymer, low density polyethylene plastics, linear low density polyethylene, linear medium density polyethylene, methacrylic acid-butadiene-styrene copolymer, methyl cellulose, medium density polyethylene, melamine-formaldehyde resin, melamine/phenol-formaldehyde resin, polyamide (nylon), polyacrylic acid, diethylene glycol carbonate, polyarylether, poly(aryl ether ketone), polyamide-imide, polyester resin, polyacrylonitrile, polyaryl amide, polyarylsulfone, polyarylester, poly(ester urethane), polybutene-1, poly(butyl acrylate), Polybutadiene-acrylonitrile, polybutadiene-styrene, poly(butylene terephthalate), polycarbonate, polychlorotrifluoroethylene, poly(diallyl terephthalate), polyethylene, polyether block amide, polyester thermoplastic elastomer, polyetheretherketone, polyetherimide, polyetherketone, poly(ethylene oxide), poly (ether sulfone), poly(ethylene terephthalate), glycol modified-poly(ethylene terephthalate), poly(ether urethane), phenol-formaldehyde resin, perfluoroalkoxy resin, phenol-furan resin, polyimide, polyisobutylene, polyimidesulfone, poly (methyl-α-chloroacrylate), poly(methyl methacrylate), poly-4-methylpentene-1, poly-α-methylstyrene, polyoxymethylene, polypropylene, polyphthalamide, poly(phenylene ether), poly(phenylene ether), poly(propylene oxide) or poly (alkylene oxide), poly(phenylene sulfide), poly(phenyl sulfone), polystyrene, polysulfone, polytetrafluorethylene, polyurethane, poly(vinyl acetate), poly(vinyl alcohol), poly (vinyl butyral), poly(vinyl chloride), poly(vinyl chloride-vinyl acetate), chlorinated poly(vinyl chloride), poly(vinyl isobutyl ether), poly(vinyl chloride-methyl vinyl ether), restricted area molding, resorcinol-formaldehyde resin, reaction injection molding, reinforced plastics, reinforced reaction injection molding, reinforced thermoplastics, styrene-acrylonitrile copolymer, styrene-butadiene-styrene block copolymer, polysiloxane, sheet molding compound, styrene-α-methylstyrene copolymer, thick molding compound, thermoplastic elastomer, toughened polystyrene, thermoplastic polyurethane, poly-4-methylpentene-1, vinyl chloride-ethylene copolymer, vinyl chloride-ethylene-methyl acrylate copolymer, vinyl chloride-ethylene-vinyl acetate, poly(vinylidene chloride), poly(vinylidene fluoride), polyvinyl fluoride, poly(vinyl formal), poly(vinyl carbazole), poly(vinyl pyrrolidone), styrene-maleic anhydride plastics, styrene-acrylonitrile plastics, styrene-butadiene plastics, silicone plastics, styrene-α-methylstyrene plastics, saturated polyester plastics, styrene-rubber plastics, ether-ester thermoplastic elastomer, olefinic thermoplastic elastomer, styrenic thermoplastic elastomer, thermoplastic elastomer, thermoplastic polyester, thermoplastic polyurethane, thermoset polyurethane, urea-formaldehyde resin, ultra-high molecular weight polyethylene, unsaturated polyester, vinyl chloride-ethylene resin, vinyl chloride-ethylene-vinyl acetate resin, vinyl chloride-methyl acrylate copolymer, vinyl chloride-methyl methacrylate copolymer, vinyl chloride-octyl acrylate resin, vinyl chloride-vinyl acetate resin, or vinyl chloride-vinylidene chloride copolymer.

The object of the present invention also is achieved by the following solutions, wherein the electronic device is embodiment in an embodiment of the present invention. The electronic device comprises: a plurality of electric components, and a housing for providing an accommodating space in which the plurality of electric components are accommodated; a first part of the housing being made of a first material; the first part of the housing having a plurality of recesses arranged in a first arrangement, and the plurality of recesses being formed by recessing an outer surface of the first part of the housing inwardly, the outer surface of the first part of the housing being provided with spaces for spacing the plurality of the recesses, and the spaces being formed between any two of the recesses on the outer surfaces of the first part of the housing after the outer surface of the first part of the housing being recessed inwardly to form the plurality of the recesses;

wherein a second material effect exhibits on the first part of the housing by the plurality of the recesses and the spaces, and the second material is different from the first material.

Further, a textile effect presents on the first part of the housing by the plurality of the recesses and the spaces and the second material effect is a textile effect, and the textile effect is an effect in visual and/or tactile senses sensed by an observer of the electronic device when observing the outer surface of the first part of the housing.

Further, the first part of the housing comprises an edge area and a central area, and the edge area surrounds the central area, and the edge area corresponds to an edge of the electronic device; the recesses comprise a first recess located in the edge area and a second recess located in the central area, a depth of the first recess being smaller than that of the second recess.

Further, the depth of the first recess is gradually reduced with far away from the central area.

Further, a circumscribed circle of a pattern which is formed by the recesses on the outer surface of the first part has a diameter of 0.08-0.38 mm, and the depth of the recesses is greater than 0.02 mm, so that the textile effect presents on the first part of the housing.

Further, circumscribed circles of the plurality of recesses have same or different diameters.

Further, the housing is manufactured by the above method.

Further, the electronic device is a cell phone, a panel computer, all-in-one PC, desktop, media player, notebook PC, TV set, display device or mobile memory.

With the above solution, the embodiments of the present invention have at least the following advantages. A texture structure having projections and grooves is provided on the inner surface of the mold. Since the sizes of the respective projections and grooves of the above texture structure are small, the refined small size can be achieved by etching the inner surface of the mold by the laser engraving method, without causing the grooves to be penetrated, so that the surface of the housing manufactured by using the mold and the injection method has a second material effect, such as textile effect and metal fabric effect. Therefore, the electronic device having such housing has a novel appearance property and a novel tactile property, and a user's experience is improved.

The above description is only a summary of the present invention. In order to make the technical solutions of the present invention more apparent, the preferable embodiments of the present invention will be further described in details, in combination with the accompanying drawings, so that one skilled in the art can carry out the present invention according to the description of the present invention.

DETAILED DESCRIPTION OF THE EMBODIMENTS

For further describing the solutions and advantages of the present invention, the method of manufacturing a housing and the electronic device provided by the present invention would be described in details in combination with the accompanying drawings and the embodiments. In the following description, "one embodiment" or "an embodiment" may indicate the same embodiment or different embodiments. Additionally, particular features, structures or characteristics described in one or more embodiments may be combined in any suitable manner.

Figure 1:
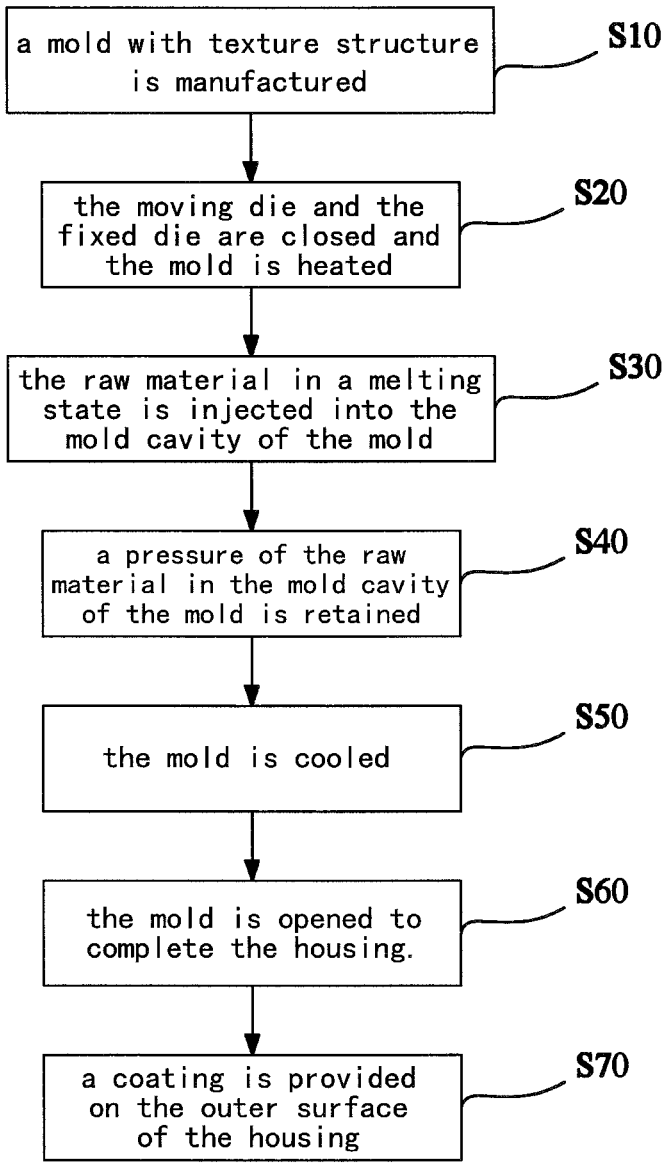
FIG. 1 is a flow chart of the method of manufacturing a housing according to an embodiment.

One embodiment of the present invention provides a method of manufacturing a housing which will be used in an electronic device. The housing is used to form a space for accommodating electric components of the electronic device. As shown in FIG. 1, it shows a flow chart of the method according to this embodiment, and the manufacturing method is an injection method. The method comprises the following steps.

Figure 2:
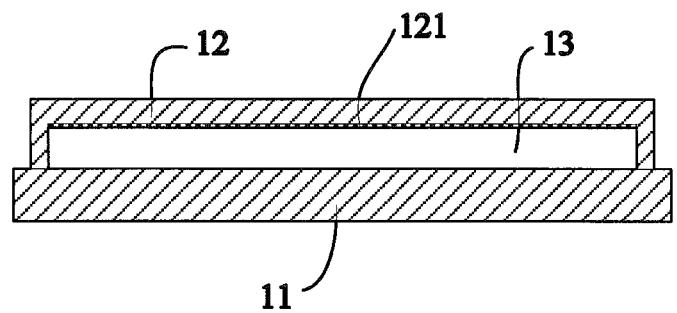
FIG. 2 is a sectional view of the mold according to an embodiment.
Figure 3:
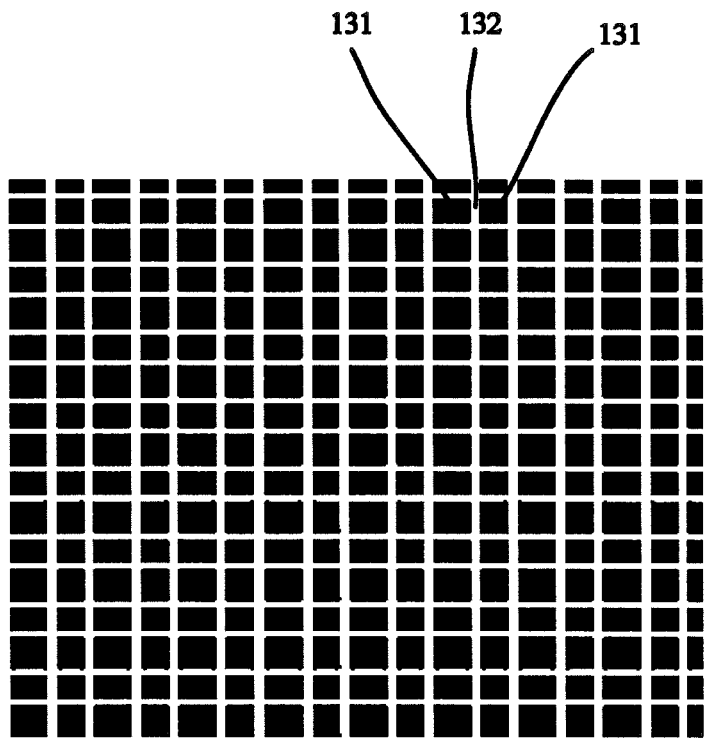
FIG. 3 is a partial enlarged view of the texture structure according to an embodiment.

At step S10, a mold is manufactured, as shown in FIG. 2 which shows a sectional view of the mold. The mold comprises at least one moving die and at least one fixed die which are matched to form an inner space. This inner space is a mold cavity of the mold. The shape and structure of the mold cavity are same as the shape and structure of the housing to be manufactured. Taking the manufacturing process of a mold for a rear cover of a flat plate-shaped cell phone as an example, a mold cavity 13 is formed by engaging (closing the dies) a moving die 12 of the mold with a fixed die 11 of the mold. The specific shapes of the fixed die 11 and the moving die 12 are determined according to the specific shape of the housing to be manufactured. In particular, the shape of the mold cavity 13 is same as that of the housing. In the present embodiment, the structure of the mold cavity 13 is basically same as the structure of the housing of the prior art, except that the mold cavity 13 further comprises a texture structure. The texture structure is provided on the inner surface of the moving die 12. Alternatively, the texture structure may be provided on the inner surface of the fixed die 11 according to the requirement, or be provided on the inner surfaces of the moving die 12 and of the fixed die 11. As shown in FIG. 3, it shows a partial enlarged view of the texture structure. The texture structure 121 is formed by etching the inner surfaces of the moving mold 12 and/or the fixed mold 11 through a laser engraving method. The texture structure 121 comprises a plurality of projections 131 arranged in an array, and grooves 132 recessed inwardly are formed between any two adjacent projections 131. The grooves 132 are formed by etching and removing a part of the material of the moving die and/or the fixed die through the laser engraving method. The shape of the projections may be hemispherical, semi ellipsoidal, rectangular parallelepiped, cone-shaped body, conical frustum or cylindrical. In the present embodiment, the material of the mold may be steel having high mirror-polished performance, such as 718 (P20+Ni type), NAKSO (P21 type), S136 (420 type), H13 type steel and so on. The inner surface of the mold is irradiated by a focused laser beam having high energy, so that the surface material of the mold is instantaneously evaporated or heated to be oxidated to form melting slag. In this way, the grooves 132 are formed. The grooves comprise transverse grooves and longitudinal grooves, and the transverse grooves are interweaved with the longitudinal grooves. Since a large number of grooves 132 are formed, a series of projections 131 not being evaporated or melted are left on the inner surface of the mold, and then the above-mentioned texture structure is formed. The transverse and the longitudinal grooves are perpendicularly interweaved in this embodiment. However, the present invention is not limited to this. The transverse and the longitudinal grooves may be interweaved, weaved or overlapped with each other at any other angles. Also, the present invention is not limited to other geometrical array's of lines. The present invention may employ overlapping or geometrical topology of lines. Since the size of the focused laser beam is very small, the heat-influence area is small, and a fine machining can be provided, the shape of the grooves, the depth of the grooves and the width of the grooves are precisely controlled. For instance, the cross section of the grooves 132 may be formed into a standard rectangular shape which cannot be achieved by a chemical etching method.

Alternatively, three-dimensional data of the surface of the textile is obtained by three-dimensionally scanning the surface of the textile, and then the three-dimensional data is input into a controller of the laser engraving machine, so that the laser engraving machine can be driven to etch the inner surface of the mold to form the corresponding texture structure. This texture structure is identical with the surface structure of the textile.

At step S20, the moving die 12 and the fixed die 11 are closed to form the mold cavity 13. Mould clamping force is 4700-6200 t/m$^2$. Then, the mold is heated to a predetermined mold temperature. The predetermined mold temperature will influence degree of finish of the housing. If the temperature is lower, the degree of finish will be lower. If ABS (acrylonitrile-butadiene-styrene terpolymer) is selected as the material for the housing, the predetermined mold temperature is 75-85° C. The heating of the mold may performed by a hot water bath.

At step S30, a raw material is heated into a melting state, and the raw material in a melting state is injected into the mold cavity of the mold. The raw material is a first material. In the present embodiment, ABS is used as a material for the housing. The ABS raw material should be heated to 220-250° C., so that ABS will be in the melting state. Then, the ABS in melting state is injected into the mold cavity 13 at the temperature of 160-220° C. by a standard screw injection molding machine (a ratio of length to diameter of the screw is 20:1, the compression ratio is greater than 2, and the injection pressure is greater than 150 MPa), the injection pressure is 500-1000 bar, and the injection speed is in a range of moderate-high speed.

At step S40, a pressure of the raw material in the mold cavity of the mold is retained, so that the raw material may be sufficiently filled into the fist texture structure. When step S30 nearly ends, the screw of the injection molding machine stops rotating and keeps moving forward. At this time, step S40 of retaining the pressure starts. The pressure retained in the step is 75-85% of the maximum injection pressure, usually is about 34-69 MPa. During retaining the pressure, the nozzle of the injection molding machine continually fills the material into the mold cavity to fill the space caused by the shrinkage of the raw material. If the step of retaining the pressure is not performed after the mold cavity is fully filled, the injection molding member will shrink about 25%, and it will be impossible to achieve the housing having the same shape as that of the mold cavity.

At step S50, the mold is cooled so as to solidify the melting raw material and to shape it into a housing shape.

At step S60, the mold is opened, and the moving die is separated from the fixed die to complete the housing.

Figure 4:
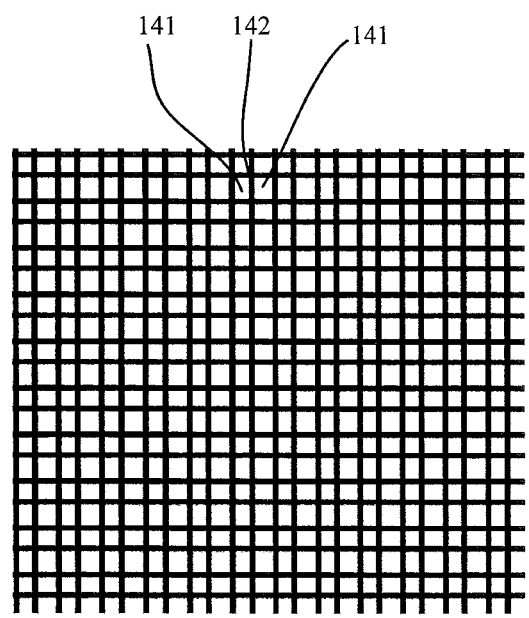
FIG. 4 is a partial enlarged view of a part of the surface of the housing according to an embodiment.

As shown in FIG. 4, it shows a partial enlarged view of a part of the surface of the housing. At least a part of the surface of the housing manufactured according to the above manufacturing method has a plurality of recesses 141 arranged in an array. The recesses 141 are formed by recessing the outer surface of the housing inwardly. Spaces 142 are provided on the outer surface of the housing for separating the recesses, and are formed between any two of the recesses 141 on the outer surface of the housing after the outer surface of the housing is recessed inwardly to form the plurality of recesses 141. The recesses 141 are formed by embedding the projections 131 into the raw material, and the spaces 142 are formed by embedding the raw material into the groove 132. A second material effect exhibits on at least the part of the surface of the housing by the plurality of recesses 141 and the spaces 142, and the second material is different from the first material.

Preferably, the second material in the above embodiment is textile, and the second material effect is textile effect. The textile effect is an effect in visual and/or tactile senses sensed by a user when the user observes and/or touches the housing. In other words, the housing looks like textile, that is, a texture in a first direction and a texture in a second direction constituted by the plurality of recesses 141 and the plurality of spaces 142 present an effect that when a viewer of the electric devicesees the device, it looks like the texture in the first direction interweaving with the texture in the second direction, or when the user touches the device, it provides a tactile feeling of textile. Preferably, the housing looks like the textile and also provide a tactile feeling of textile.

Figure 5:
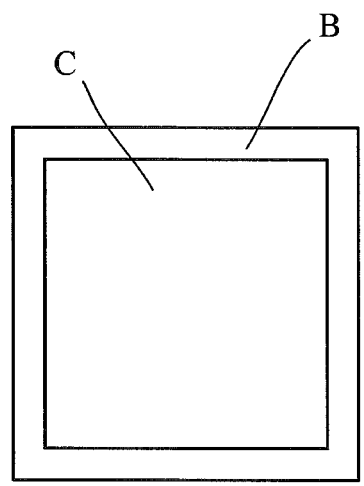
FIG. 5 is a partitioned view of the texture structure.

Preferably, as shown in FIG. 5, it shows a partitioned view of the texture structure. In the above embodiment, the texture structure comprises an edge area B and a central area C, and the edge area B surrounds the central area C. The edge area corresponds to an edge of the electronic device. The projections comprise a first projection located in the edge area and a second projection located in the central area, and a height of the first projection is lower than that of the second projection. There is no clear boundary between the edge area B and the central area C. With the above-designed textile structure, a part of the surface of the housing may comprise a central area and an edge area, and the edge area of the housing surrounds the central area of the housing, and the edge area of the housing corresponds to an edge of the electronic device. The recesses comprise a first recess located in the edge area of the housing and a second recess located in the central area of the housing, and the depth of the first recess is lower than that of the second recess, so that the housing looks more like a textile in visual and/or tactile senses.

Preferably, in the above embodiment, for the texture structure, in the edge area B of the texture structure, the height of the first projection becomes gradually lower with far away from the central area. Correspondingly, in the edge area of the part of the surface of the housing, the depth of the second recess becomes gradually lower with far away from the central area, so that the housing looks more like a textile.

Preferably, in the above embodiment, a circumscribed circle of the cross section, which has the maximum area, of the projection has a diameter of 0.08-0.38 mm, and the height of the projections is greater than 0.02 mm. Correspondingly, a circumscribed circle of a pattern which is formed by the recesses on the outer surface of the first part has a diameter of 0.08-0.38 mm. The depth of the recesses is 0.02-0.38 mm, preferably is 0.03-0.05 mm, so that the textile effect presents on the first part of the housing. In general, the texture structure having the above configuration provides the effect of the textile. If beyond the scope of the above configuration, it is difficult to present a textile effect in visual sense and tactile sense. If beyond the scope of the above configuration too much, the housing will look like wool weaving, and if below the scope of the above configuration too much, the texture structure will be unclear. Additionally, the sizes of the respective different projections may be same or different with each other. Within the above size range, if the diameter of the circumscribed circles of the respective projections has a difference of about 10%, the housing also may present textile effect.

Preferably, the shape, depth, and arrangement of the respective projections in the texture structure may be changed according to the specific design requirement. For example, in order to present a *chrysanthemum* visual effect on the surface of the housing, the projections may be provided to have different heights according to different positions at which the projections will be located in the *chrysanthemum*. At the same time, the arrangement of the respective projections may be in conformity with orientations of the petals of the *chrysanthemum*, and the widths of the grooves between the respective projections may also be changed accordingly. Certainly, the number of the *chrysanthemum* on the housing may be multiple, for example, the arrangement of 4*10 chrysanthemums may be presented on a rear cover of the cell phone. In accordance with the above ideas, the surface of the housing may present different pictures by the different configurations of the shape, depth and arrangement of the projections.

Preferably, the first part of the housing may be provided with one or more portions having a certain geometrical feature, for example, a circular camera aperture on the housing. In this case, with regard to the texture structure, the heights of the projections located near the portions having the geometrical features may present a texture effect of gradually increasing, or may present a texture effect of gradually reducing. The arrangements of the projections also present an effect of being gradually changed, so that the area around the camera aperture of the housing product presents a shading change visually or track change of the texture, such as a change between flat surface and curved surface, or a change between the center and the edge.

Preferably, besides the above steps, the method of manufacturing a housing according to the present embodiment further comprises the step S70. At step S70, a coating is provided on the outer surface of the housing, and the coating is a pattern layer. Existing textile patterns may be selected as the pattern. The material for the coating layer is dye, pigment, coating material, oil paint or metal. The coating layer is provided on the outer surface of the housing by spray coating, printing, vacuum evaporating, vacuum splattering, electroplating or transfer printing in the mold. When the material for the coating layer is dye, pigment, coating material or oil paint, the visual effect of the housing is more like the textile effect. When the material for the coating layer is metal, the housing presents a visual effect of metal weaving.

Preferably, the first material in the above embodiments may be thermosetting plastics, thermoplastic plastics, metal or rubber. Specifically, the first material is acrylonitrile-butadiene-acrylate copolymer, acrylonitrile-butadiene-styrene copolymer, acrylonitrile-ethylene-styrene copolymer, acrylonitrile-methyl methacrylate copolymer, poly(aromatic ester), acrylonitrile-styrene resin, acrylonitrile-styrene-acrylate copolymer, cellulose acetate plastics, cellulose acetate-butyrate plastics, cellulose acetate propionate, general cellulose plastics, cresol-formaldehyde resin, carboxymethyl cellulose, cellulose nitrate, cellulose propionate, chlorinated polyethylene, chlorinated poly(vinyl chloride), casein, cellulose triacetate, ethyl cellulose, ethylene-ethyl acrylate copolymer, ethylene-methacrylic acid copolymer, epoxy resin, ethylene-propylene-dieneterpolymer, ethylene-propylene copolymer, expanded polystyrene, ethylene-tetrafluoroethylene copolymer, ethylene-vinyl acetate copolymer, ethylene-vinyl alcohol copolymer, perfluoro(ethylene-propylene) plastics, furan-formaldehyde, high density polyethylene plastics, high impact-resistant polystyrene, impact resistant polystyrene, liquid crystal polymer, low density polyethylene plastics, linear low density polyethylene, linear medium density polyethylene, methacrylic acid-butadiene-styrene copolymer, methyl cellulose, medium density polyethylene, melamine-formaldehyde resin, melamine/phenol-formaldehyde resin, polyamide (nylon), polyacrylic acid, diethylene glycol carbonate, polyarylether, poly(aryl ether ketone), polyamide-imide, polyester resin, polyacrylonitrile, polyaryl amide, polyarylsulfone, polyarylester, poly(ester urethane), polybutene-1, poly(butyl acrylate), Polybutadiene-acrylonitrile, polybutadiene-styrene, poly(butylene terephthalate), polycarbonate, polychlorotrifluoroethylene, poly(diallyl terephthalate), polyethylene, polyether block amide, polyester thermoplastic elastomer, polyetheretherketone, polyetherimide, polyetherketone, poly(ethylene oxide), poly(ether sulfone), poly(ethylene terephthalate), glycol modified-poly(ethylene terephthalate), poly(ether urethane), phenol-formaldehyde resin, perfluoroalkoxy resin, phenol-furan resin, polyimide, polyisobutylene, polyimidesulfone, poly(methyl-α-chloroacrylate), poly(methyl methacrylate), poly-4-methylpentene-1, poly-α-methylstyrene, polyoxymethylene, polypropylene, polyphthalamide, poly(phenylene ether), poly(phenylene ether), poly(propylene oxide) or poly(alkylene oxide), poly(phenylene sulfide), poly(phenyl sulfone), polystyrene, polysulfone, polytetrafluorethylene, polyurethane, poly(vinyl acetate), poly(vinyl alcohol), poly(vinyl butyral), poly(vinyl chloride), poly(vinyl chloride-vinyl acetate), chlorinated poly(vinyl chloride), poly(vinyl isobutyl ether), poly(vinyl chloride-methyl vinyl ether), restricted area molding, resorcinol-formaldehyde resin, reaction injection molding, reinforced plastics, reinforced reaction injection molding, reinforced thermoplastics, styrene-acrylonitrile copolymer, styrene-butadiene-styrene block copolymer, polysiloxane, sheet molding compound, styrene-α-methylstyrene copolymer, thick molding compound, thermoplastic elastomer, toughened polystyrene, thermoplastic polyurethane, poly-4-methylpentene-1, vinyl chloride-ethylene copolymer, vinyl chloride-ethylene-methyl acrylate copolymer, vinyl chloride-ethylene-vinyl acetate, poly(vinylidene chloride), poly(vinylidene fluoride), polyvinyl fluoride, poly(vinyl formal), poly(vinyl carbazole), poly(vinyl pyrrolidone), styrene-maleic anhydride plastics, styrene-acrylonitrile plastics, styrene-butadiene plastics, silicone plastics, styrene-α-methylstyrene plastics, saturated polyester plastics, styrene-rubber plastics, ether-ester thermoplastic elastomer, olefinic thermoplastic elastomer, styrenic thermoplastic elastomer, thermoplastic elastomer, thermoplastic polyester, thermoplastic polyurethane, thermoset polyurethane, urea-formaldehyde resin, ultra-high molecular weight polyethylene, unsaturated polyester, vinyl chloride-ethylene resin, vinyl chloride-ethylene-vinyl acetate resin, vinyl chloride-methyl acrylate copolymer, vinyl chloride-methyl methacrylate copolymer, vinyl chloride-octyl acrylate resin, vinyl chloride-vinyl acetate resin, or vinyl chloride-vinylidene chloride copolymer, rubber, gold, silver, copper, aluminum, chromium, nickel or alloy. After the first material is determined, respective process parameters of step S20 to step S70 can be changed accordingly. Those skilled in the art may find a corresponding solution in the injection molding technology or casting technology, the details are omitted herein.

Figure 6:
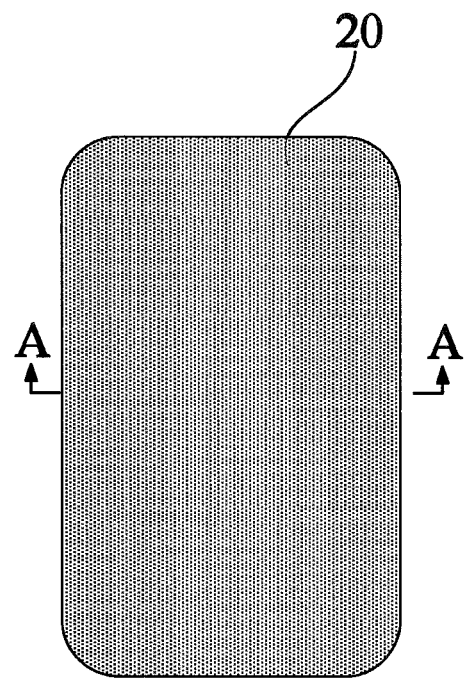
FIG. 6 is a top view of the first part of the housing.
Figure 7:
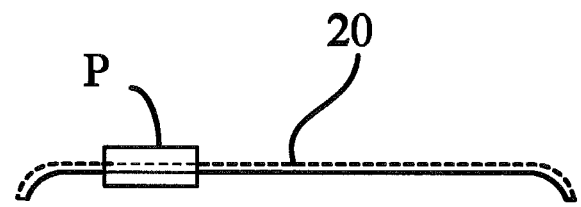
FIG. 7 is a sectional view, taken along the line A-A, of the first part of the housing shown in FIG. 6.
Figure 8:
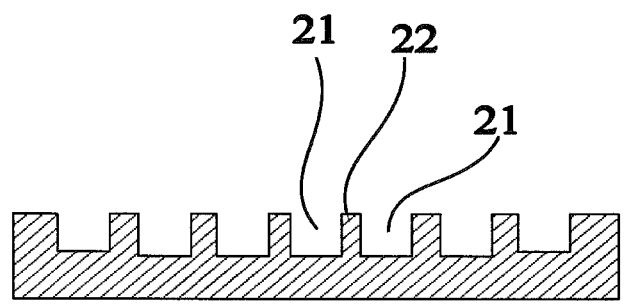
FIG. 8 is a partial enlarged view at the P location of the section of the housing shown in FIG. 7.

An electronic device also is provided according to an embodiment of the present invention. The device comprises a plurality of electric components and a housing for providing an accommodating space in which the plurality of electric components are accommodated. The plurality of electric components are cooperated with each other to achieve the function of the electronic device. The housing comprises a first part made of a first material. As shown in FIGS. 6-8, FIG. 6 shows a top view of the first part of the housing, FIG. 7 is a sectional view, taken along line A-A, of the first part of the housing shown in FIG. 6, and FIG. 8 is a partial enlarged view at the P location of the section of the housing shown in FIG. 7. The outer surface of the first part 20 of the housing has a plurality of recesses 21 meeting a first arrangement. The plurality of recesses 21 are formed by recessing the outer surface of the first part of the housing inwardly. The outer surface of the first part of the housing has spaces 22 for spacing the plurality of the recesses 22. The spaces 22 are formed between any two of the recesses 21 on the outer surface of the first part of the housing after the outer surface of the first part of the housing is recessed inwardly to form the plurality of recesses 21. A second material effect exhibits on the first part of the housing by the plurality of recesses 21 and the spaces 22, and the second material is different from the first material. The second material is a textile, and the second material effect is a textile effect. The textile effect is an effect in visual and/or tactile senses sensed by a viewer of the electric device when viewing the outer surface of the first part of the housing. Further, the second material effect may be an effect that when the user or viewer of the electronic device sees the electronic device, the housing of the electronic device looks like being covered with a textile layer visually, that is, a texture in a first direction and a texture in a second direction constituted by the plurality of recesses 141 and the plurality of spaces 142 present an effect that when a viewer of the electronic device sees the device, it looks like the texture in the first direction interweaving with the texture in the second direction. Further, when the skin of the viewer touches the housing of the electronic product, the viewer has a feeling of touching the textile.

Preferably, the first part of the housing comprises a central area and an edge area, and the edge area surrounds the central area. The edge area corresponds to an edge of the electric device. The recesses comprise a first recess located in the edge area and a second recess located in the central area, and the depth of the first recess is lower than that of the second recess. The central area is not the geometrical center of the first part of the housing, but is an area corresponding to the edge area, and all the area which is surrounded by the edge area is considered as the central area. Further, in the first part of the housing, the depth of the first recess becomes gradually lower with far away from the central area, in other words, the nearer the recess is close to the edge of the electronic device, the lower the depth of the recess is, and it is in conformity with the effect of the surface of the textile.

Preferably, in the above embodiment, a circumscribed circle of a pattern which is formed by the recesses on the outer surface of the first part has a diameter of 0.08-0.38 mm, and the depth of the recesses is 0.02-0.38 mm, so that the textile effect presents on the first part of the housing. In general, the texture having the above configuration provides the effect of the textile. If beyond the scope of the above configuration, it is difficult to present a textile effect in visual sense and tactile sense. If beyond the scope of the above configuration too much, the housing will look like wool weaving, and if below the scope of the above configuration too much, the texture structure will be unclear. Further, the sizes of the respective different circumscribed circles of the recesses may be same or different with each other. Within the above size range, the diameter of the circumscribed circles of the respective recesses has a difference of 10%, the housing also may present textile effect.

Preferably, the shape, depth, and arrangement of the respective recesses in the first part of the housing may be changed according to the specific design requirement. For example, in order to present a *chrysanthemum* visual effect on the first part of the housing, the recesses may be provided to have different depths according to different positions at which the recesses will be located in the *chrysanthemum*. At the same time, the arrangement of the respective recesses may be in conformity with orientations of the *chrysanthemum* petals, and the widths of the spaces between the respective recesses may also be changed accordingly. Certainly, the number of the *chrysanthemum* on the housing may be multiple, for example, the arrangement of 4*10 chrysanthemums may be presented on a rear cover of the cell phone. In accordance with the above ideas, the surfaces of the first part of the housing may be regarded as a drawing board, and the surface of the housing may present different pictures by the different configurations of the shape, depth, and arrangement of the recesses.

Preferably, the first part of the housing may be provided with one or more portions having a certain geometrical feature, for example, a circular camera aperture on the housing. In this case, the depths of the recesses located near the portions having the geometrical features may present a texture effect of gradually increasing, or may present a texture effect of being gradually reduced. The arrangements of the recesses also present an effect of being gradually changed, so that the area around the camera aperture presents a shading change visually or track change of the texture, such as a change between flat surface and curved surface, a change between the center and the edge.

Preferably, in order to make the housing look like being covered with a textile layer, a coating is provided on the outer surface of the first part of the housing according to the embodiment of the present invention, and the coating layer is a pattern layer. Existing textile patterns may be selected as the pattern, so that the housing more easily presents a textile effect visually for the viewer of the electronic device. The material of the coating layer is dye, pigment, coating material, oil paint or metal. The coating layer is provided on the outer surface of the housing by spray coating, printing, vacuum evaporating, vacuum splattering, electroplating or transfer printing in the mold. When the material for the coating layer is dye, pigment, coating material or oil paint, the visual effect of the housing is more like the textile effect. When the material for the coating layer is metal, the housing presents a visual effect of metal weaving. Preferably, the housing according to the above embodiments is manufactured by the above method of manufacturing a housing.

Further, the electronic device is a cell phone, a panel computer, an all-in-one PC, a desktop, a media player, a notebook PC, a TV set, a display device or a mobile memory.

Preferably, the material for the housing in the above embodiments is thermosetting plastics, thermoplastic plastics, metal or rubber. Specifically, the first material is acrylonitrile-butadiene-acrylate copolymer, acrylonitrile-butadiene-styrene copolymer, acrylonitrile-ethylene-styrene copolymer, acrylonitrile-methyl methacrylate copolymer, poly(aromatic ester), acrylonitrile-styrene resin, acrylonitrile-styrene-acrylate copolymer, cellulose acetate plastics, cellulose acetate-butyrate plastics, cellulose acetate propionate, general cellulose plastics, cresol-formaldehyde resin, carboxymethyl cellulose, cellulose nitrate, cellulose propionate, chlorinated polyethylene, chlorinated poly(vinyl chloride), casein, cellulose triacetate, ethyl cellulose, ethylene-ethyl acrylate copolymer, ethylene-methacrylic acid copolymer, epoxy resin, ethylene-propylene-dieneterpolymer, ethylene-propylene copolymer, expanded polystyrene, ethylene-tetrafluoroethylene copolymer, ethylene-vinyl acetate copolymer, ethylene-vinyl alcohol copolymer, perfluoro(ethylene-propylene) plastics, furan-formaldehyde, high density polyethylene plastics, high impact-resistant polystyrene, impact resistant polystyrene, liquid crystal polymer, low density polyethylene plastics, linear low density polyethylene, linear medium density polyethylene, methacrylic acid-butadiene-styrene copolymer, methyl cellulose, medium density polyethylene, melamine-formaldehyde resin, melamine/phenol-formaldehyde resin, polyamide (nylon), polyacrylic acid, diethylene glycol carbonate, polyarylether, poly(aryl ether ketone), polyamide-imide, polyester resin, polyacrylonitrile, polyaryl amide, polyarylsulfone, polyarylester, poly(ester urethane), polybutene-1, poly(butyl acrylate), Polybutadiene-acrylonitrile, polybutadiene-styrene, poly(butylene terephthalate), polycarbonate, polychlorotrifluoroethylene, poly(diallyl terephthalate), polyethylene, polyether block amide, polyester thermoplastic elastomer, polyetheretherketone, polyetherimide, polyetherketone, poly(ethylene oxide), poly (ether sulfone), poly(ethylene terephthalate), glycol modified-poly(ethylene terephthalate), poly(ether urethane), phenol-formaldehyde resin, perfluoroalkoxy resin, phenol-furan resin, polyimide, polyisobutylene, polyimidesulfone, poly(methyl-α-chloroacrylate), poly(methyl methacrylate), poly-4-methylpentene-1, poly-α-methylstyrene, polyoxymethylene, polypropylene, polyphthalamide, poly(phenylene ether), poly(phenylene ether), poly(propylene oxide) or poly(alkylene oxide), poly(phenylene sulfide), poly(phenyl sulfone), polystyrene, polysulfone, polytetrafluorethylene, polyurethane, poly(vinyl acetate), poly(vinyl alcohol), poly(vinyl butyral), poly(vinyl chloride), poly(vinyl chloride-vinyl acetate), chlorinated poly(vinyl chloride), poly(vinyl isobutyl ether), poly(vinyl chloride-methyl vinyl ether), restricted area molding, resorcinol-formaldehyde resin, reaction injection molding, reinforced plastics, reinforced reaction injection molding, reinforced thermoplastics, styrene-acrylonitrile copolymer, styrene-butadiene-styrene block copolymer, polysiloxane, sheet molding compound, styrene-α-methylstyrene copolymer, thick molding compound, thermoplastic elastomer, toughened polystyrene, thermoplastic polyurethane, poly-4-methylpentene-1, vinyl chloride-ethylene copolymer, vinyl chloride-ethylene-methyl acrylate copolymer, vinyl chloride-ethylene-vinyl acetate, poly(vinylidene chloride), poly(vinylidene fluoride), polyvinyl fluoride, poly(vinyl formal), poly(vinyl carbazole), poly(vinyl pyrrolidone), styrene-maleic anhydride plastics, styrene-acrylonitrile plastics, styrene-butadiene plastics, silicone plastics, styrene-α-methylstyrene plastics, saturated polyester plastics, styrene-rubber plastics, ether-ester thermoplastic elastomer, olefinic thermoplastic elastomer, styrenic thermoplastic elastomer, thermoplastic elastomer, thermoplastic polyester, thermoplastic polyurethane, thermoset polyurethane, urea-formaldehyde resin, ultra-high molecular weight polyethylene, unsaturated polyester, vinyl chloride-ethylene resin, vinyl chloride-ethylene-vinyl acetate resin, vinyl chloride-methyl acrylate copolymer, vinyl chloride-methyl methacrylate copolymer, vinyl chloride-octyl acrylate resin, vinyl chloride-vinyl acetate resin, or vinyl chloride-vinylidene chloride copolymer, rubber, gold, silver, copper, aluminum, chromium, nickel or alloy.

Concerning the above, the preferred embodiments of the present invention have been described. The present invention is not limit to the above description in any manner. Although preferred embodiments of the present invention have been shown and described, those having ordinary skill will understand that the present invention can make changes or modification to these embodiments without departing from the spirit and the principles in the general concept of the present invention, the scope of the present invention is defined by the claims and their equivalents. Such change or modification will be within the general concept of the present invention.

What is claimed is:

1. An electronic device, comprising:
    a plurality of electric components;
    a housing for providing an accommodating space in which the plurality of electric components is accommodated;
    a first part of the housing being made of a single first material into a uniform construction which is integrally molded;
    the first part of the housing having a plurality of recesses arranged in a first arrangement, and the plurality of recesses being formed by recessing an outer surface of the first part of the housing inwardly; and
    the outer surface of the first part of the housing being provided with spaces for spacing the plurality of the recesses, and the spaces being formed between any two of the recesses on the outer surface of the first part of the housing after the outer surface of the first part of the housing being recessed inwardly to form the plurality of the recesses;
    wherein:
        portions of the outer surface of the first part of the housing which have the plurality of recesses are arranged to face away from the accommodating space and exposed in an outside of the housing;
        a second material effect exhibits on the first part of the housing by the plurality of the recesses and the spaces, and the second material is different from the first material;
        a textile effect presents on the first part of the housing by the plurality of the recesses and the spaces and the second material effect is the textile effect, and the textile effect is embodied in visual and/or tactile senses sensed by an observer of the electronic device when observing the outer surface of the first part of the housing;
        a texture in a first direction and a texture in a second direction constituted by the plurality of recesses and the plurality of spaces present the textile effect seen by an observer of the electric device, demonstrating that the texture in the first direction interweaving with the texture in the second direction, or when the user touches the device, present a tactile feeling of textile; and
        the first part of the housing comprises an edge area and a central area, and the edge area surrounds the central area, and the edge area corresponds to an edge of the electronic device, and the plurality of the recesses comprise a first recess located in the edge area and a second recess located in the central area, a depth of the first recess being smaller than that of the second recess.

2. The electronic device according to claim 1, characterized in that, the depth of the first recess is gradually reduced with far away from the central area.

3. The electronic device according to claim 1, characterized in that, a circumscribed circle of a pattern which is formed by the recesses on the outer surface of the first part has a diameter of 0.08-0.38 mm, and the depth of the recesses is greater than 0.02 mm, so that the textile effect presents on the first part of the housing.

4. The electronic device according to claim 3, characterized in that, circumscribed circles of the plurality of recesses have same or different diameters.

5. The electronic device according to claim 1, characterized in that, the electronic device is a cell phone, a panel computer, an all-in-one PC, a desktop, a media player, a notebook PC, a TV set, a display device or a mobile memory.

* * * * *